United States Patent [19]
Louden

[11] 3,990,252
[45] Nov. 9, 1976

[54] EARTHWORKS CONSOLIDATION SYSTEM

[75] Inventor: Lester Richard Louden, Houston, Tex.

[73] Assignee: Dresser Industries, Inc., Dallas, Tex.

[22] Filed: Mar. 19, 1975

[21] Appl. No.: 560,019

[52] U.S. Cl. .............................. 61/100; 61/36 A; 61/50
[51] Int. Cl.² ..................................... E02D 21/00
[58] Field of Search ................ 61/35, 36, 46, 50; 166/292, 293

[56] References Cited
UNITED STATES PATENTS

| | | | |
|---|---|---|---|
| 1,547,189 | 7/1925 | Wilson | 61/36 R |
| 2,053,562 | 9/1936 | Jorgensen | 61/36 R X |
| 2,159,954 | 5/1939 | Powell et al. | 61/36 R |
| 2,233,872 | 3/1941 | Proctor | 61/36 R |
| 2,968,572 | 1/1961 | Peeler | 61/36 R X |
| 3,842,607 | 10/1974 | Kelseaux et al. | 61/46 |

*Primary Examiner*—Paul R. Gilliam
*Assistant Examiner*—David H. Corbin
*Attorney, Agent, or Firm*—Eddie E. Scott

[57] ABSTRACT

An earthworks is constructed by consolidating solids and/or slurries and using the consolidated material for constructing the earthworks. A quantity of less than 150 grams of hydraulic cement and a quantity of soluble alkali metal silicate containing less than 11 grams of $SiO_2$ are mixed with each liter of the solids and/or slurry to produce a water insoluble solidified material. The material thus produced is used for the construction of the earthworks. The material can be worked in with other solids, the material will not leach chemicals and the material does not break down into colloidal size particles that would remain suspended in water.

15 Claims, 2 Drawing Figures

EARTHWORKS CONSOLIDATION SYSTEM

BACKGROUND OF THE INVENTION

The present invention relates to the art of constructing earthworks systems and, more particularly, to a system of using unconsolidated materials for constructing an earthworks system.

During the construction of certain earthworks systems, problems arise because the materials used for constructing the earthworks may tend to disperse into adjacent water. In some instances the materials to be used in constructing the earthworks contain chemicals that could potentially be damaging to the environment. Under such conditions it is essential that the chemicals not leach from the earthworks. In other instances the material available for use in constructing the earthworks tends to be of colloidal size and could potentially pollute nearby water by migrating to the water and remaining suspended in the water. The migration of the earthworks material is in itself damaging to the structure of the earthworks system. This condition is aggravated if the earthworks is acted upon by waves and other water movement such as tides and currents.

A need clearly exists for a method of consolidation of otherwise unsuitable solids into a material useful in earthwork construction and so using the consolidated material in earthwork construction. The consolidated material should be adapted to be worked in with solids without leaching of chemicals in the original material into free water in the soil, and should not break down into colloidal sizes that pollute water by remaining suspended in the water.

DESCRIPTION OF PRIOR ART

In U.S. Pat. No. 3,842,607 to R. M. Kelseaux et al. patented Oct. 22, 1974, assigned to Cities Service Oil Company, a method of constructing Arctic islands is disclosed. Artificial permafrost islands are constructed within Arctic sea waters to provide offshore sites from which oil and gas wells can be drilled. Sand and gravel are dredged from the floor of the sea and are redeposited at another location where an island is desired. The dredging and redepositing of sand and gravel are continued until a suitable insular shape and height are obtained. Subsequently, a slurry of silt in sea water, also obtained from the floor of the sea, is deposited on the heap of sand and gravel. A thickener; e.g., a gellant or a viscosifier, is incorporated into the slurry to effect consolidation of the ingredients so that they do not flow back into the sea after the slurry has been deposited on the island. Examples of the gellants are sodium and potassium and silicates, certain polyaccharidic gums such as xanthan gums and certain proteins such as gelatine. The water of the thickened slurry eventually freezes upon exposure to the sub-zero temperatures of the environment, thereby converting the island into a permafrost structure which serves as a solid platform for a drilling rig, material, equipment, housing, storage, etc.

In U.S. Pat. No. 3,312,070 to Shinichiro Maisuo et al., patented Apr. 4, 1967, a method of reclaiming ground is shown. The invention provides a method for forming reclaimed ground using coagulative surface active agents, which are admixed with the earth particles containing the delivery water, resulting in the deposition of a uniform earth fill.

Earth particles used to provide fill are made up of a variety of types and sizes. These are generally characterized as clay which is finer than 5 microns; silt which is between about 5 microns and 50 microns; and sand which is considered to have a grain diameter size of between 50 microns and 2 millimeters. Other constituents of the solid fill material may be larger particles such as cobble, pebbles, gravel, etc., or exceedingly fine particles in the colloidal size range. When water carrying a mixture of such earth particles is exited from an outlet, the larger particles tend to deposit in the areas closest to the outlet, and the very fines tend to deposit in the areas farthest from the outlet. In many land fill operations, a considerable proportion of the fines do not deposit within the desired area and is wasted with the overflow water. The ground reclaimed under such conditions is non-uniform and has various disadvantages when considered as a base for roadways, buildings, etc. Attempts have been made to provide greater uniformity by frequent changes in position of the outlet of the pipe through which the earth fill is delivered. This increases cost and has not been technically advantageous.

In the invention, a small effective amount of a coagulative surface active agent is introduced into the pipe containing the water and earth particles at a predetermined position within about 200 meters from the discharge outlet so that, after discharge from the pipe, the earth particles settle rapidly to form a reclaimed ground deposit having superior properties including a substantially uniform load bearing capacity. Whereas the deposits formed when not using the coagulative agent appear to be primarily deposits of coarse grained material such as sand, gravel, etc., at one location and deposits of fine particles such as clay, silt, and the like, at another location, the deposits formed when using the coagulative surface active agent are a relatively uniform aggregated structure formed from a deposited admixture of both coarse and fine particles.

In U.S. Pat. No. 3,675,430 patented July 11, 1972, an arctic construction and drilling method is shown. A method for constructing a working base in a permafrost area wherein the working base is located in bodies of water meeting certain requirements. A method for constructing a working base in a body of water and the working base itself.

In U.S. Pat. No. 3,654,766 patented Apr. 11, 1972, a drilling pad is shown. A pad for drilling at least one borehole through the earth, the pad being composed of a first layer of particulate material adjacent the earth, a second layer composed of spaced apart members to form a plurality of channels therein, and a third layer composed of support material. A method for drilling a borehole through tundra and permafrost without substantially thawing same by using the above-described pad for carrying out the drilling procedure.

In U.S. Pat. No. 3,803,852 patented Apr. 16, 1974, a process for building an island is shown. A foundation is built up in a body of water by depositing artificial seaweed in a specified area on the bottom of the body of water then depositing sand particles in the area defined by the seaweed, and repeating the process in successively smaller areas so that a foundation such as an island is built up.

In U.S. Pat. No. 3,499,491 to Reece E. Wyant et al., patented Mar. 10, 1970, a method and composition for cementing oil well casings is disclosed. The process consists of cementing a string of pipe in a borehole by combining a properly treated aqueous drilling fluid with a cementitious mixture comprising hydraulic cement and powdered sodium silicate glass to form a mud concrete. The increased temperature of the borehole triggers a setting reaction of the mud concrete. The string of pipe is cemented in the borehole by preparing an aqueous drilling fluid comprising clay minerals treated with alkali and organic dispersants selected from the group consisting of lignites, tannins, lignosulfonates, and mixtures thereof, there being sufficient dispersants to make the fluid resistant to the gelling effect of cement additions, said fluid having a density of at least 10 pounds per gallon, adding to said drilling fluid to form a mud concrete 100 to 200 pounds per barrel of a cementitious combination comprising hydraulic cement and powdered sodium silicate glass in a ratio between 6:1 and 2:1, said sodium silicate glass having a $Na_2O:SiO_2$ ratio from 1:1.6 to 1:4.5, pumping the mud concrete into the annular space between the string of pipe and the walls of the borehole, and allowing the mud concrete to set due to the increased temperature of the borehole.

In British Patent Specification No. 1,337,301 to Environmental Sciences, Inc., published Nov. 14, 1973, a system of land improvement with waste materials is disclosed. The method consists of treating land of little practical use with waste material of industrial or domestic origin by subdividing the waste material, mixing the subdivided material with an aqueous solution of alkali metal silicate and with a silicate setting agent, depositing the mixture on the surface of said land, the proportions of silicate and said agent acting to consolidate the mixture into an inert, stable product substantially insoluble in ground water.

SUMMARY OF THE INVENTION

The present invention provides a system for constructing an earthworks. A material is produced by the consolidation of solids and/or slurries. The material is used in the construction of the earthworks. The consolidated material can be worked in with other solids without the leaching of chemicals from the original material into free water and the consolidated material does not break down into colloidal sizes that pollute water by remaining suspended in the water. The solids and slurries to be consolidated may contain in excess of 20% oil by volume without resulting in the leaching of the oil from the consolidated material. When used as a barrier layer between contaminated fluids and potable fluids, the material effectively prevents the passage of contaminants and has the property of being so friable that it readily settles into the spaces between pieces of gravel and/or sand to stabilize them, retaining approximately an initial configuration. The above and other features and advantages of the present invention will become apparent from the following detailed description of the invention when taken in conjunction with the accompanying drawings.

DETAILED DESCRIPTION OF THE INVENTION

According to the broad aspect of this invention, there is provided a system for constructing all types of earthworks wherein it is suitable to use a material low in colloidal content and which may be flowed or packed into a desired configuration either in containers or spaces or in the interstices between larger solid pieces such as rocks, gravel, bricks, or in mounds or piles which are to retain an appreciable angle of repose. For example, earthworks that may be constructed include artificial islands, oil well drilling pads, shore line modifications, bulkheads, breakwaters, earthfills, sanitary landfills, and landscaping mounds. Also included are semipermeable barriers as used in some dikes, levees, or dams. The system herein described is particularly useful where materials normally used are not readily available or where their use would be destructive to the environment as by quarrying, and permits the use of waste materials or readily available materials which are unsuitable in their natural form such as mud, silts, and clays.

It has been found that by combining cement and soluble alkali metal silicates with solids and/or slurries, a solidified material can be produced using substantially less added material than if cement or soluble alkali metal silicates were separately combined with the solids and/or slurry. Less than 150 grams per liter cement and less than 37.5 grams per liter soluble alkali metal silicate are mixed with the solids and/or slurry. The material formed by the mixture is used to construct the earthworks. Apparently, the soluble alkali metal silicate activates the cement even in the presence of cement retarders and combines with the cement for an insoluble cementitious material which encloses the material of the solid and/or slurry. The hydraulic cement used in this process is selected from a class represented by Portland Cement, high-alumina cement, high strength cement, slow-set cement, and silicate resistant cement. The cement may be a mixture of two or more cements selected from the aforementioned class. The required amount of cement and soluble alkali metal silicate used together are very much lower than would be required to produce an equivalent solidified material when either is used separately.

Figure 1:
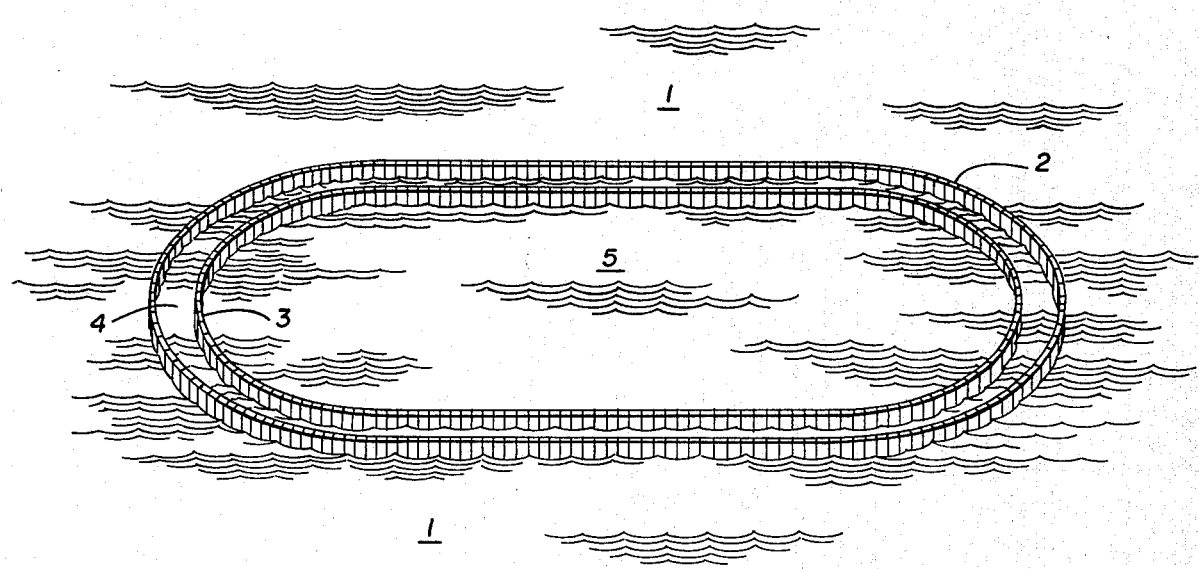
FIG. 1 illustrates the forming of an island perimeter.

In order to more fully illustrate the present invention, but without in any way limiting the scope of the invention, the following example of the construction of an artificial island will be described with reference to FIG. 1. The island thus constructed is useful as a site for oil well drilling rigs. The site for the island is chosen within a body of water 1. A set of forms comprising forms 2 and 3 is placed at the desired location in the shape of the desired island. The forms 2 and 3 may be conventional wood forms generally used for constructing walls for buildings or the like. A slurry of material is dredged up from the floor of the body of water 1 in which the island is to be constructed. The slurry may consist of sand, gravel, or silt or combinations thereof. The dredging may be done in accordance with well-known dredging practices and equipment.

A cement and a soluble alkali metal silicate are mixed with the slurry of material dredged from the floor of body of water 1. It has been discovered that when both a cement and a soluble alkali metal silicate are mixed with the slurry of material, the slurry will be solidified with a substantially smaller total amount of added cement and soluble alkali metal silicate than if either cement or soluble alkali metal silicate were added alone. The cement is first thoroughly mixed with the slurry of material. Immediately before the slurry is deposited for setting, a silicate solution is mixed with the slurry-cement mixture. For example, an amount of cement falling within the range of 150 grams to 14 grams is mixed with each liter of the slurry in a mixing tank. As the slurry-cement mixture is being pumped from the mixing tank, an amount of "N-brand" silicate solution falling within the range of 37.5 grams (11 grams $SiO_2$) to 10.5 grams (3 grams $SiO_2$) is mixed with each liter of the slurry-cement mixture.

The final mixture is placed in the area 4 between the forms 2 and 3. Once the material sets, an island perimeter is produced that will not easily be washed out by waves or tide action. The interior 5 of the island perimeter may then be solidified to form a base for conducting operations such as the drilling of oil and gas wells. In extremely cold climates, the interior of the island perimeter can be filled with dredgings from the floor of the body of water in which the island is location and the dredgings allowed to freeze to form a permafrost island. It is also possible to fill the interior of the island perimeter with a material constructed by solidifying slurries of the material dredged from the floor of the body of water in which the island is to be built. A quantity of less than 150 grams of hydraulic cement and a quantity of a soluble alkali metal silicate containing less than 11 grams of $SiO_2$ are mixed with each liter of the slurry from the floor of the body of water to produce a water-insoluble solidified material. The material is used to fill the interior of the island perimeter.

Figure 2:
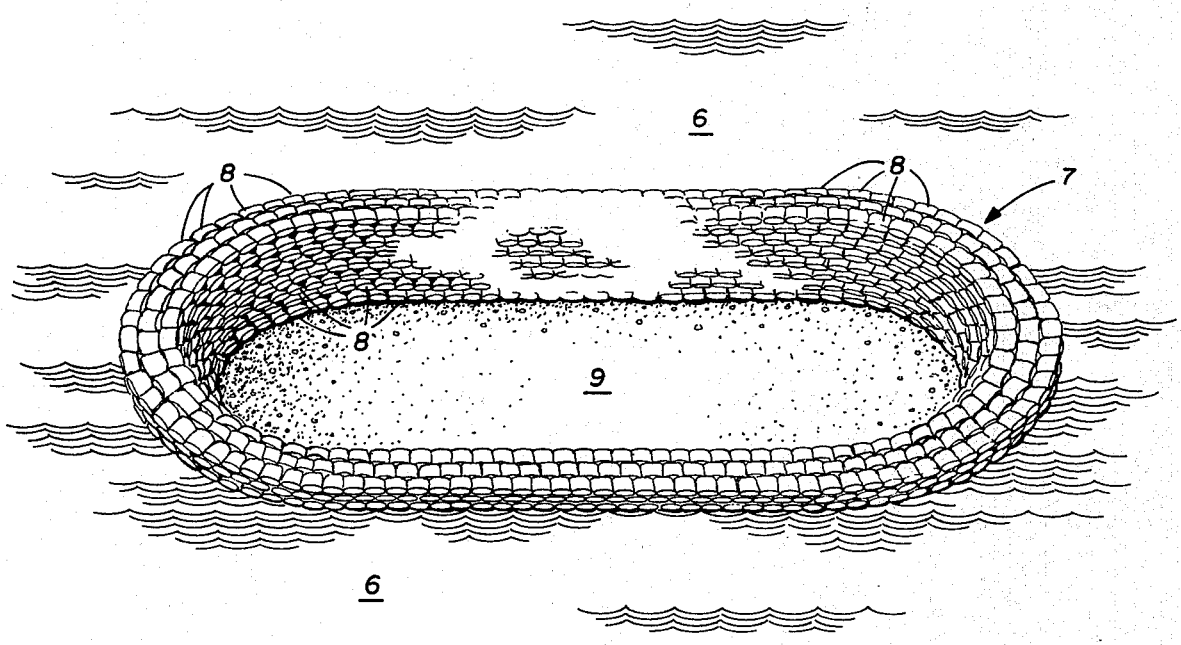
FIG. 2 illustrates the forming of an island perimeter using bags of solidified material.

Referring now to FIG. 2, another example of the construction of an island will be described. A site for the island is chosen; for example, a location 6 in the Arctic Ocean where the water is relatively shallow and an island is needed for use as a base for conducting drilling operations in an attempt to locate and/or produce oil and gas may be chosen. For one reason or another, it may be desirable to construct the island at a location wherein suitable quantities of sand and gravel for forming the island are not readily available. Materials dredged from the floor of the ocean 6 may be the primary solids of the island. If larger solids such as rocks and gravel are present, they may be dredged up and deposited either as a perimeter for the island or as a solid base and as such they are first built up to extend above the wave action. If solids of the desired sizes are not present, cement and a soluble alkali metal silicate are used to consolidate the mud and silt dredged from the floor of the ocean 6 and the consolidated material is then deposited in containers 8 such as bags or cans which are used to form the island perimeter 7. Subsequently, additional consolidated solids may be used to fill interstices between the containers or between coarser materials used in the construction and to fill the center area 9 if only a perimeter section 7 was first prepared. The treated solids may be so deposited before they solidify so they flow readily into the interstices, or they may be allowed to solidify (or "set") and then be handled very much as clay-like soil or soft sandstone to complete the construction.

During the construction of the island, problems may be encountered because the materials used for constructing the island tend to wash out. In many instances the location for the island is in a remote area, and the transportation of materials to the remote location is extremely expensive and should be held to a minimum. Accordingly, a need exists for a system of constructing a man-made island that will make use of readily available materials insofar as possible. The island should not be easily washed out, and chemicals or materials used in the construction of the island should not leach out. It has been discovered that when both a cement and a soluble alkali metal silicate are mixed with slurries obtained by the dredging operation, the slurries will be solidified with a substantially smaller total amount of added cement and soluble alkali metal silicate than if either cement or soluble alkali metal silicate were added alone. Apparently, the soluble alkali metal silicate activates the cement even in the presence of cement retarders and combines with the cement for an insoluble cementitious material which encloses the material of the slurry. The hydraulic cement used in this example is selected from a class represented by Portland Cement, high-alumina cement, high strength cement, slow-set cement, and silicate resistant cement. The cement may be a mixture of two or more cements selected from the aforementioned class. The required amount of cement and soluble alkali metal silicate used together is very much lower than would be required to produce an equivalent solidified material when either is used separately.

The slurry in most instances will consist of a mixture of sand, gravel and silt or combinations thereof. The dredging may be done in accordance with well-known dredging practices and equipment. A hydraulic cement selected from a class represented by Portland Cement, high-alumina cement, high strength cement, slow-set cement, and silicate resistant cement or a mixture of two or more of the cements selected from the aforementioned class is thoroughly mixed with the slurry. Immediately before the slurry is deposited for setting, a soluble alkali metal silicate solution is mixed with the slurry-cement mixture. For example, an amount of cement falling within the range of 150 grams to 14 grams is mixed with each liter of the aqueous slurry in a mixing tank. As the waste slurry-cement mixture is being pumped from the mixing tank, an amount of N-brand silicate solution falling within the range of 37.5 grams (11 grams $SiO_2$) to 10.5 grams (3 grams $SiO_2$) is mixed with each liter of the slurry-cement mixture. The final mixture is pumped into the bags 8 or other containers and the bags 8 are positioned to form the island perimeter 7. Once the material sets, an island perimeter 8 is formed that will not easily be washed out by waves, tidal action or other water movement. The interior 9 of the island perimeter 8 can be solidified to form a base for drilling oil and gas wells. In the cold climate of the arctic, the interior 9 of the island perimeter 7 may be filled with the dredgings from the floor of the ocean 6 and the dredgings allowed to freeze to form a permafrost island. Alternatively, the interior 9 of the island perimeter 7 may be filled with a material formed by solidifying the slurry dredged from the ocean floor in the manner previously described.

The embodiments of the invention in which an exclusive property or privelege is claimed are defined as follows:

1. A method of constructing an island projecting from the floor of a body of water using a water insoluble solidified material produced from an unconsolidated material such as dredgings from the floor of said body of water, comprising:
   obtaining said unconsolidated material,
   mixing a quantity of hydraulic cement within the range of 150 grams to 14 grams and a quantity of a soluble alkali silicate containing an amount of $SiO_2$ within the range of 11 grams to 3 grams with each liter of said unconsolidated material, said soluble alkali metal silicate and hydraulic cement will combine to produce said solidified material, providing a temporary restraining means for initial forming of an island perimeter, placing said hydraulic cement, soluble alkali metal silicate, and unconsolidated material within said restraining means and forming an island perimeter, and filling in the interior of said island perimeter with a material that will form a stable island.

2. The method of claim 1 wherein said cement is Portland cement.

3. The method of claim 1 wherein said cement is high alumina cement.

4. The method of claim 1 wherein said cement is high early-strength cement.

5. The method of claim 1 wherein said cement is slow-set cement.

6. The method of claim 1 wherein said cement is sulfate resistant cement.

7. A method of constructing an island in a body of water using an aqueous slurry of readily available materials such as dredgings, comprising:

obtaining said aqueous slurry of readily available materials;

mixing a quantity of cement within the range of 150 grams to 14 grams with each liter of said aqueous slurry;

mixing a quantity of soluble alkali metal silicate containing an amount of $SiO_2$ within the range of 11 grams to 3 grams with each liter of aqueous slurry, said soluble alkali metal silicate and cement will combine to form a water insoluble solidified material;

placing said aqueous slurry, cement and soluble alkali metal silicate in individual bags;

using said bags for constructing said island by placing said bags in the form of a perimeter of the desired island; and filling the interior of said island perimeter to form a stable island.

8. The method of claim 7 wherein said material is positioned to form an island perimeter.

9. The method of claim 8 including the steps of providing forms in the general shape of the island perimeter and filling said forms with said material.

10. The method of claim 8 including the steps of placing said material in bags and using said bags filled with said material to form an island perimeter.

11. The method of claim 8 wherein said cement is Portland cement.

12. The method of claim 8 wherein said cement is high alumina cement.

13. The method of claim 8 wherein said cement is high early-strength cement.

14. The method of claim 8 wherein said cement is slow-set cement.

15. The method of claim 8 wherein said cement is sulfate resistant cement.

* * * * *